United States Patent [19]
Hofmann et al.

[11] Patent Number: 5,743,367
[45] Date of Patent: Apr. 28, 1998

[54] MULTIPLE PLATE FRICTION CLUTCH WITH AXIAL STOP

[75] Inventors: Klaus Hofmann, Leutershausen; Klaus Betten, Rütschenhausen; Jürgen Loibersbeck, Grafenrheinfeld; Thomas Schubert, Grettstadt; Peter Wiggen, Grafenrheinfeld, all of Germany

[73] Assignee: Fichtel & Sachs AG, Schweinfurt, Germany

[21] Appl. No.: 651,091

[22] Filed: May 21, 1996

[30] Foreign Application Priority Data

| May 22, 1995 | [DE] | Germany | 195 18 679.6 |
| Jan. 31, 1996 | [DE] | Germany | 195 49 337.0 |

[51] Int. Cl.⁶ ..................................... F16D 13/52
[52] U.S. Cl. ............................ 192/70.2; 192/109 R
[58] Field of Search ............... 192/70.2, 70.19, 192/109 R, 70.21; 403/359

[56] References Cited

U.S. PATENT DOCUMENTS

| 3,894,621 | 7/1975 | Quick | 192/109 R |
| 4,124,318 | 11/1978 | Sagady | 403/359 X |
| 4,450,943 | 5/1984 | Long | 192/70.2 |
| 4,828,091 | 5/1989 | Gustin | 192/70.2 X |
| 4,846,326 | 7/1989 | Tilton et al. | |
| 5,301,779 | 4/1994 | Nash | 192/70.2 |
| 5,305,943 | 4/1994 | Walker | |

FOREIGN PATENT DOCUMENTS

| 1152895 | 8/1963 | Germany . |
| 2604528 | 8/1977 | Germany . |
| 3321659 | 12/1983 | Germany . |
| 3936871 | 5/1990 | Germany . |
| 1154634 | 6/1969 | United Kingdom . |
| 2251899 | 7/1992 | United Kingdom . |
| 2256240 | 12/1992 | United Kingdom . |

*Primary Examiner*—Rodney H. Bonck
*Attorney, Agent, or Firm*—Nils H. Ljungman and Associates

[57] ABSTRACT

A multiple plate friction clutch with a hub which has external gearing and a peripheral groove. A ring or a ring segment is placed in this groove and is used to fix the hub in place axially with respect to the clutch plates, which are non-rotationally engaged by means of internal gearing with the external gearing of the hub.

8 Claims, 6 Drawing Sheets

MULTIPLE PLATE FRICTION CLUTCH WITH AXIAL STOP

BACKGROUND OF THE INVENTION

1. Field of the Invention

The present invention relates to a multiple plate friction clutch. Such multiple plate friction clutches may employ carbon plates for the driving and/or driven plates, thereby providing a light weight clutch.

2. Background Information

A multiple plate friction clutch is disclosed, for example, in U.S. Pat. No. 4,846,326. On this multiple plate friction clutch, there is a hub which has a plurality of fingers which extend radially and are distributed over the periphery, and in which a corresponding clutch plate with a matching contour is engaged to transmit torque. In the axial space between the two clutch plates, the hub is provided with an encircling web which has the same outside diameter as the fingers. By means of this web, the hub is guided in the axial direction during the operation of the complete friction clutch. Such a construction is used above all in friction clutches in which the plates are made of carbon material.

Such a hub has disadvantages in terms of the manufacturing technology required, and must be machined by cutting it out of solid material. It thereby has a relatively large diameter and thus requires a great deal of space for its installation.

OBJECT OF THE INVENTION

One object of the present invention is the provision of a multiple plate friction clutch that can be manufactured economically, and wherein the space available for its installation can simultaneously be utilized more efficiently.

SUMMARY OF THE INVENTION

Because the inventive hub, viewed in the axial direction, is divided into two parts in the vicinity of its external gear teeth, in that the hub body is provided with a first axial partial gearing, and a gear-wheel-like component which has a second axial partial gearing is connected to the hub body such that between them, there is a groove in which the axial stop is located, it is possible to realize the axial stop in the form of a simple encircling ring. In one advantageous embodiment, the gear-wheel-like component is attached by means of its inside diameter on an outside diameter of the hub body, and in the hub body, on the side facing the component, there is a shoulder on which the axial stop in the form of a concentric ring is placed. It is thereby advantageously possible to press (or shrink) the component onto the hub body. After the pressing (or shrinking) process, the component is in contact with the shoulder, and thus forms the groove in which the concentric ring is located.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to a number of preferred embodiments which are illustrated in the accompanying drawings, wherein.

DESCRIPTION OF THE PREFERRED EMBODIMENTS

Figure 1:
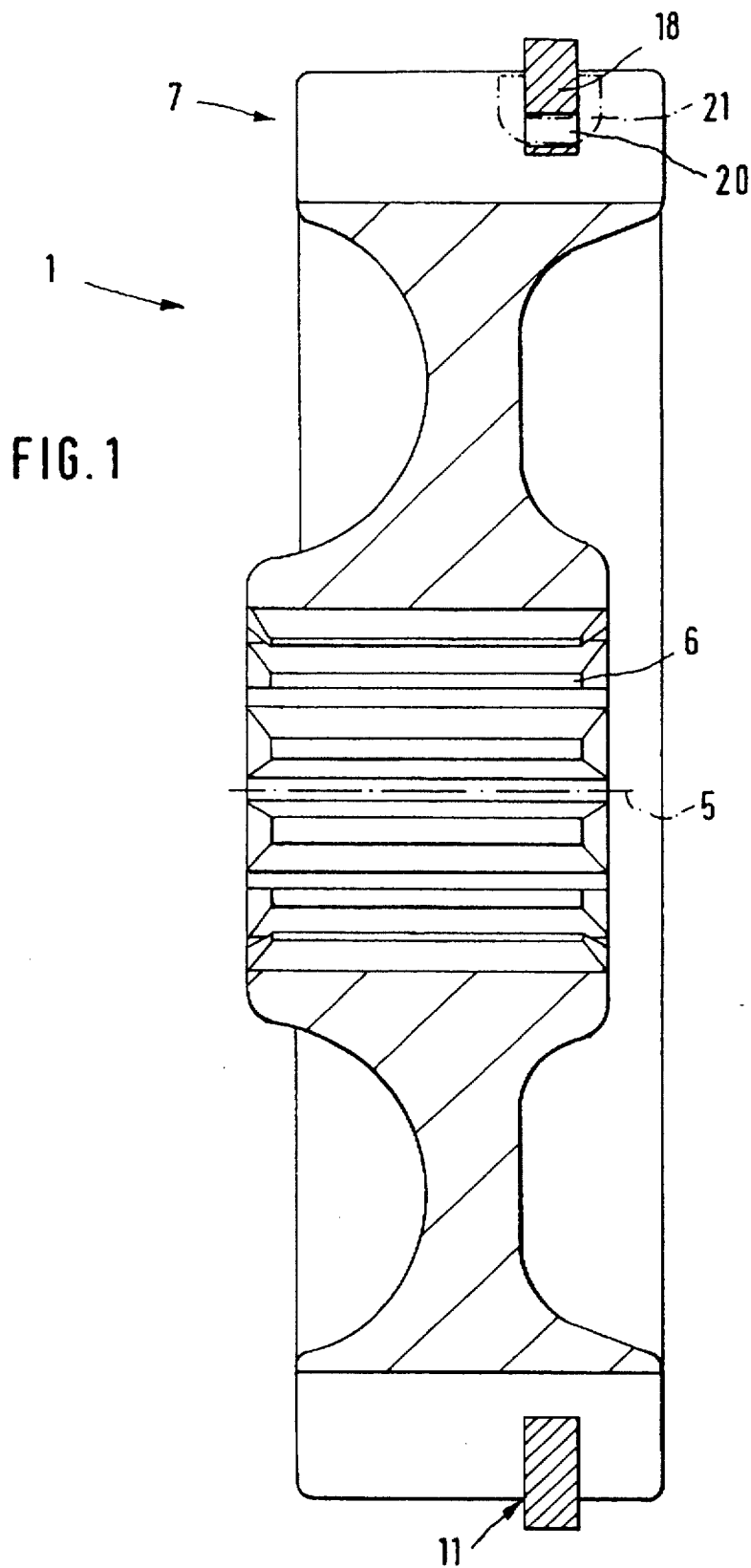
FIGS. 1 and 2 are a longitudinal section and a partial plan view, respectively, of a first embodiment of the invention.
Figure 2:
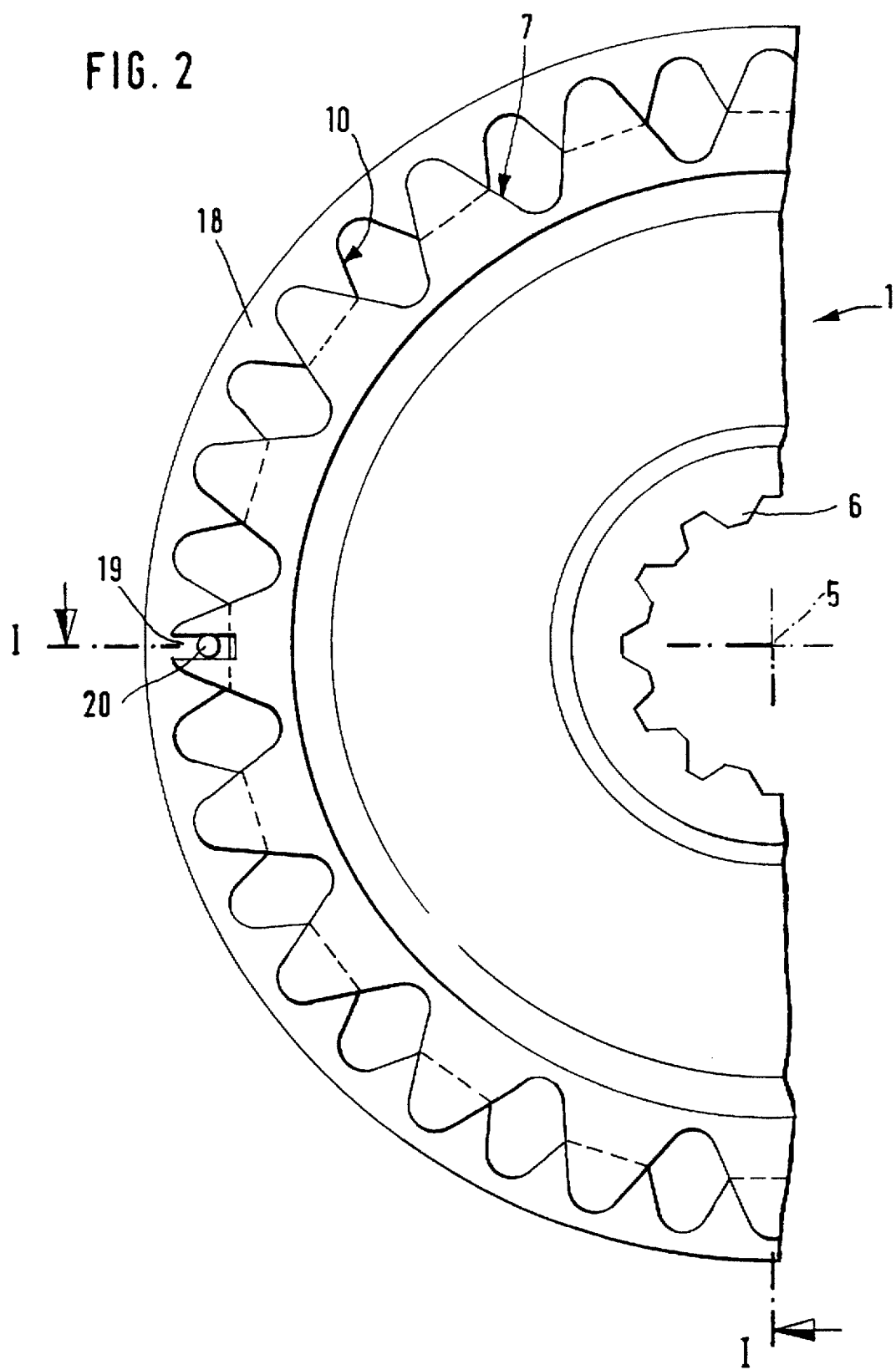

FIGS. 1 and 2 show a hub 1 which, concentric to an axis of rotation 5, is provided with internal gear teeth 6 so that it can be attached non-rotationally but so that it can move axially on a transmission shaft, which transmits the torque from the clutch into the transmission. The hub 1, in the vicinity of its outside diameter, it provided with external gear teeth 7 which extend axially outward, and which can be realized similar to a spur gearing on gear wheels. Engaged with these external gear teeth 7, in the complete friction clutch (See, e.g., FIG. 6), there are preferably at least two clutch plates which have corresponding internal gear teeth, whereby the clutch plates are fastened non-rotationally but can move axially. Since these clutch plates are often fixed in the axial direction by the conventional components of the friction clutch, for the axial fixing of the hub 1, a stop is provided by the present invention so that the hub 1 is axially fixed in position with respect to the two clutch plates. It is also possible to have a plurality of clutch plates engaged in the external gearing 7, and in such a case (as illustrated in FIG. 1) the axial stop need not be necessarily located centrally with respect to the external gearing 7. In the first embodiment of the invention shown in FIGS. 1 and 2, the stop consists of a preferably closed, encircling ring 18, the outside diameter of which is larger than the outside diameter of the external gearing 7. The ring 18 is provided on its inside diameter with internal gearing 10 which is realized in the form of gearing which matches the external gearing 7 of the hub 1, as a result of which the ring 18 can be pressed (or shrunk) by means of its internal gearing 10 onto the external gearing 7 of the hub 1. To fix the ring 18 in place axially, an encircling groove 11 is introduced in the peripheral circumference of the external gearing 7 at an appropriate point, which encircling groove 11 is used to rotate the ring 18—when it overlaps axially with the encircling groove 11—by approximately one-half tooth space, as a result of which the ring 18 is thereby fixed axially in position with respect to the hub 1. To preserve the position which is rotated by approximately one-half tooth space, there is provided a securing device which consists of an axial groove 19 or slot which is open toward the radial outside, and which is located in one tooth of the external gearing 7 of the hub 1. In the ring 18, there is also provided a longitudinal hole (or slot) 20 located in one tooth on the diameter area of the axial groove 19. During assembly, both the longitudinal hole 20 and the axial groove 19 are overlapped axially and are locked in position in relation to one another by means of a securing element 21. The securing element 21 can be a pin which is plastically deformed after it has been introduced, as shown in FIG. 1.

Figure 3:
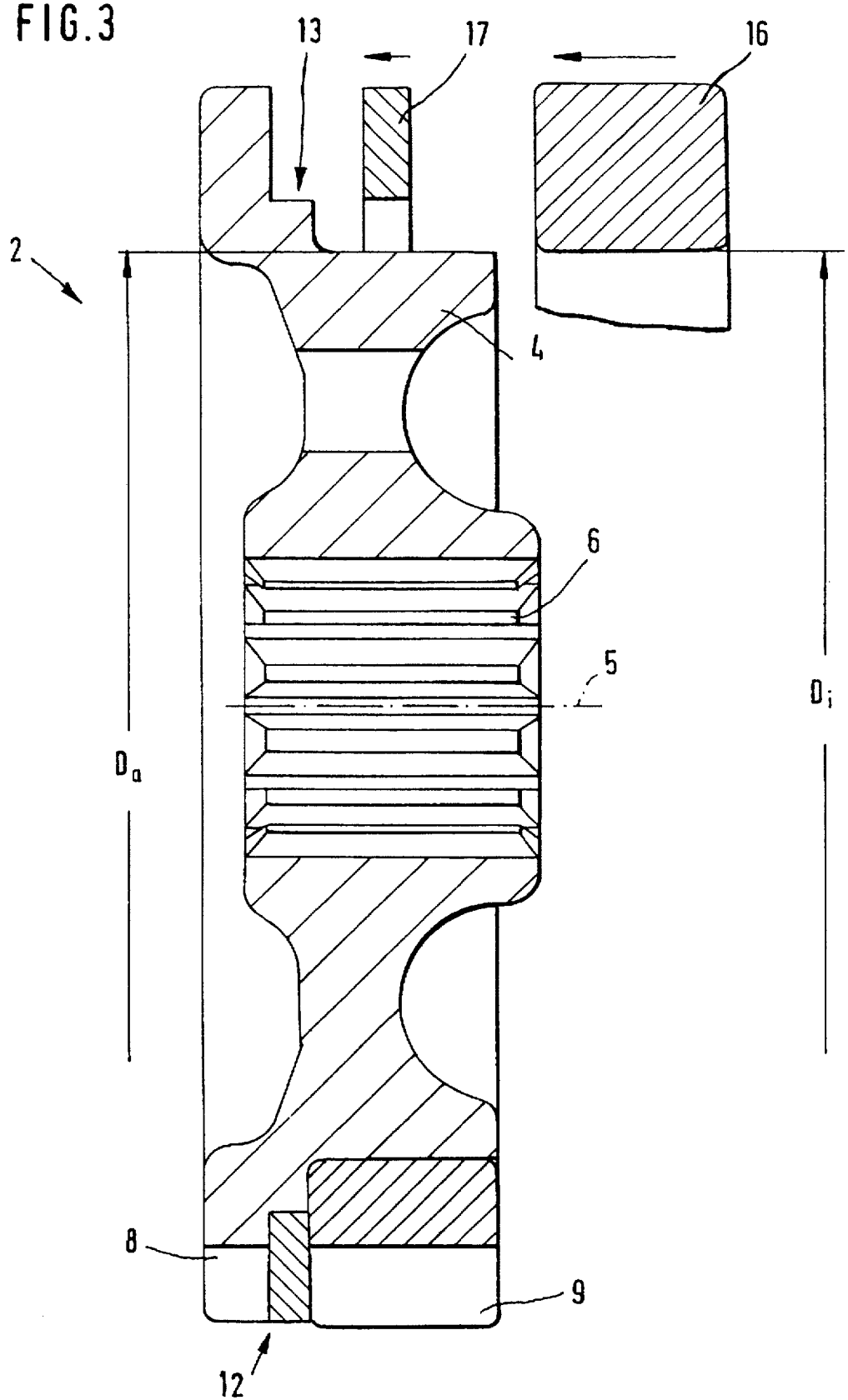
FIG. 3 is a longitudinal section through a second embodiment, shown partly disassembled.

An alternative hub according to the invention illustrated in FIG. 3 is based on a two-part hub 2. The hub body 4 of the hub 2 is provided with a first axial partial gearing 8 which covers only a small axial distance. The rest of the hub 2, in the form of the second axial partial gearing 9, is made separately by a separate component 16, which has approximately the shape of a gear wheel. In axial alignment with the first axial partial gearing 8 of the hub body 4, this hub body 4 is provided first with a shoulder 13, and then with a diameter $D_a$. The component 16 is axially placed by means of its inside diameter $D_i$ on this diameter $D_a$ of the hub body 4, and is pushed to the shoulder 13. At this point, there can advantageously be an interference fit, e.g., a force fit. The space provided by the shoulder 13 in the form of a radially open groove 12 is used to insert an encircling ring 17 before the assembly of the hub body 4 and the separate component 16, the ring 17 thereby forming an axial stop. After assembly, the ring 17 is fixed in place axially, and the clutch plates can be supported on it.

Figure 4:
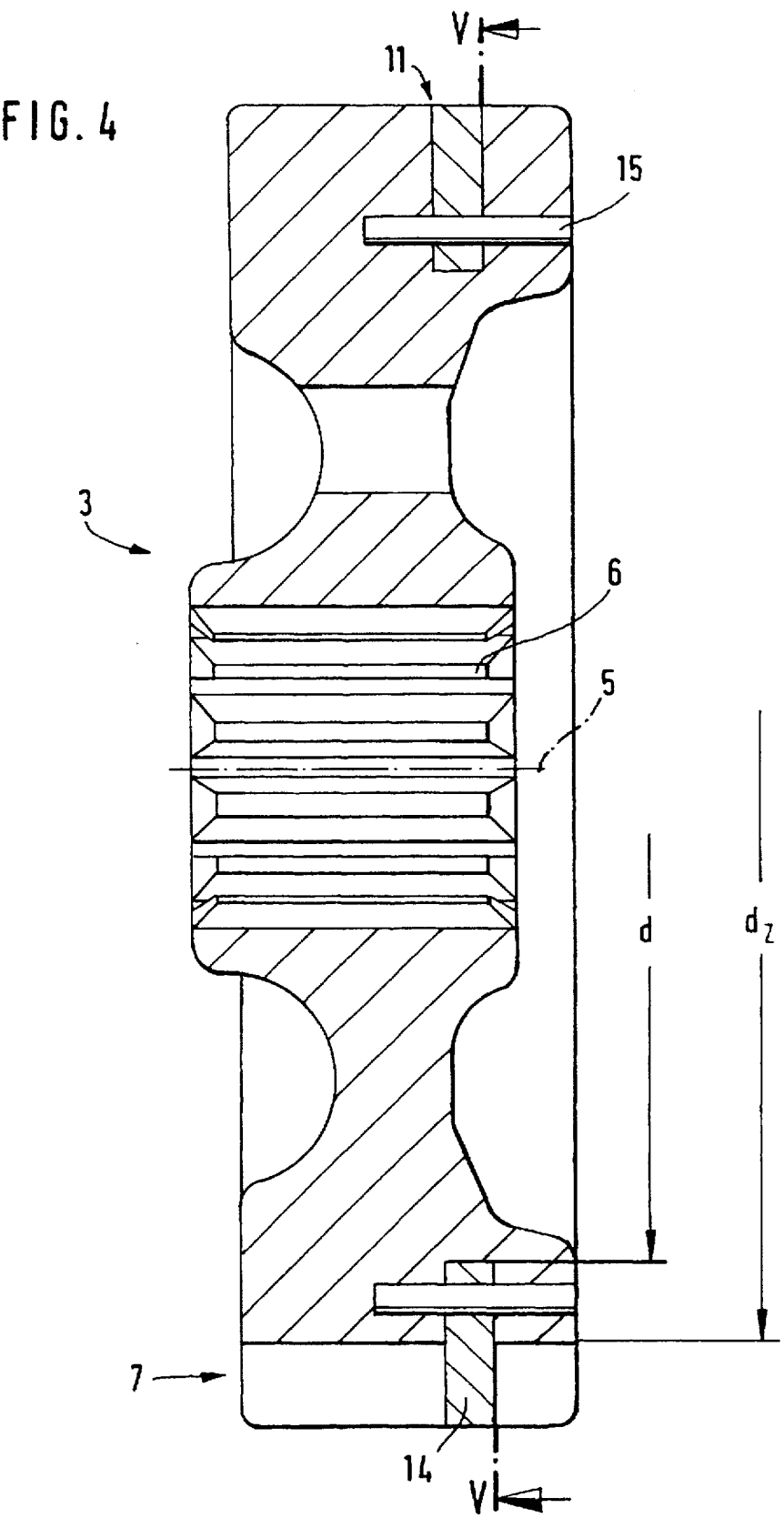
FIGS. 4 and 5 are respectively a longitudinal section and a partial plan view of a third embodiment of the invention.
Figure 5:
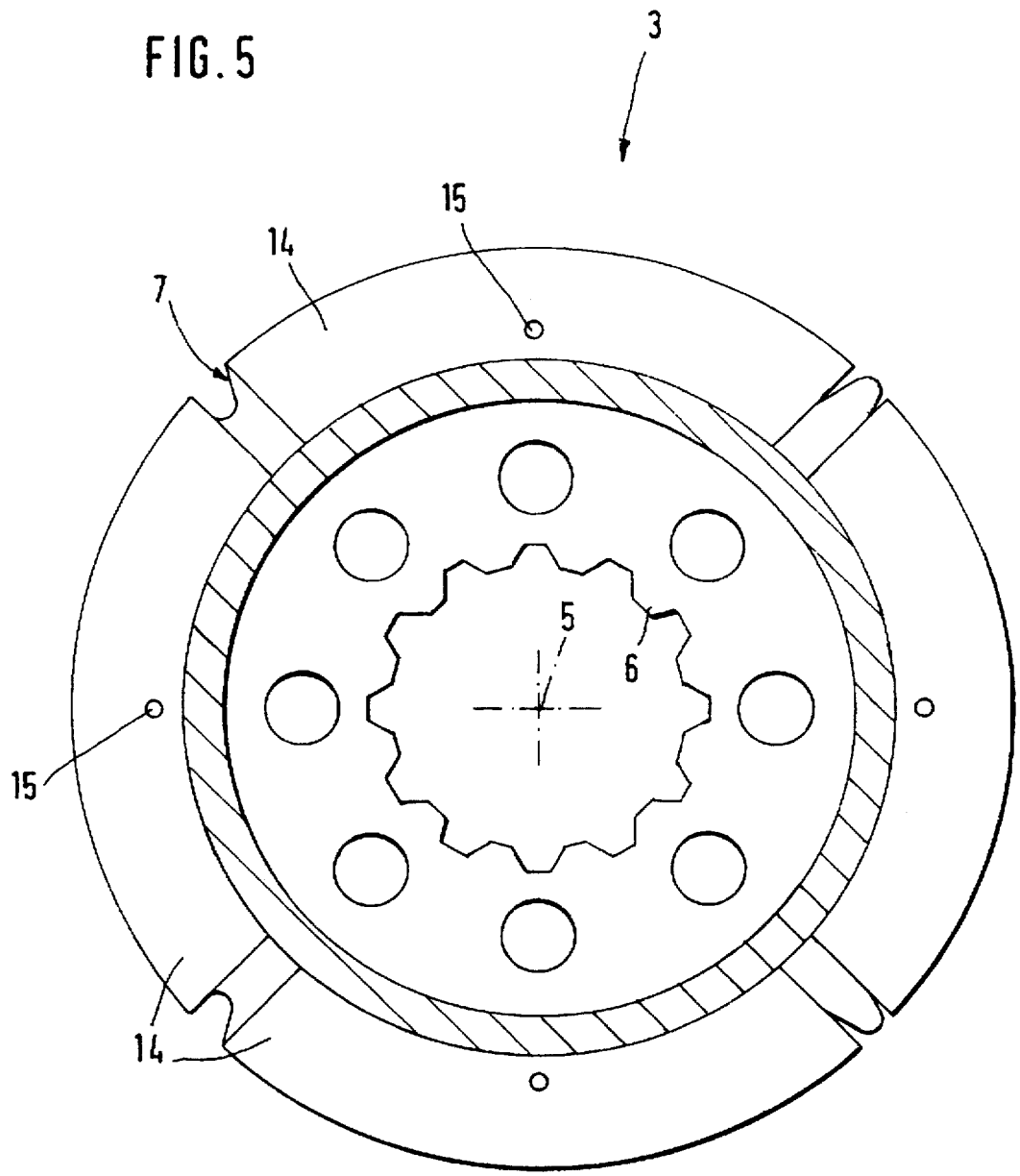

A third variant of the inventive hub is illustrated in FIGS. 4 and 5. In this case, the hub 3 is realized as one piece with its internal gear teeth 6 and its external gearing 7, and an encircling groove 11 is introduced from radially outside into the external gearing 7 of the hub 3. The encircling groove 11 preferably has a smaller diameter d than the root diameter $d_z$ of the external gear teeth 7. Preferably, a plurality of circular segments 14 distributed over the periphery are introduced into the encircling groove 11 from radially outside, where they function as an axial stop. In the area radially between the diameter d and the diameter $d_z$, there is a hole provided in the hub 3 for each circular segment 14, the hole also extending into the circular segment 14. By introducing a fastening pin 15 into each of these holes, each circular segment 14 can be fixed in position in the radial direction.

Referring back now to the embodiment of the hub of the present invention illustrated in FIGS. 1 and 2, the hub 1 is provided with internal gearing (or a spline fitting) 6 by means of which the hub 1 may be mounted on a correspondingly geared (or splined) transmission (or power output) shaft, as is well known in the art. The hub is thereby rotationally coupled to the transmission shaft but is preferably free to move axially thereon in a direction parallel to the axis of rotation 5 of the transmission shaft. The hub 1 is additionally provided with external peripheral gearing 7 on the peripheral surface extending circumferentially around the hub 1. According to the present invention, the hub 1 additionally includes an axial stop member (e.g., reference numeral 18 in FIGS. 1 and 2) which is positioned on the circumferential peripheral surface thereof and which extends in a radially outward direction from the hub 1. The axial stop member preferably extends at least radially beyond the root surface (or root diameter) of the external peripheral gearing 7.

The hub 1 has a first face facing along the axis of rotation 5 in a first direction and a second face facing in an opposite direction to the first face of the hub 1. The axial stop member divides the external peripheral gearing 7 of the hub 1 into a first peripheral gearing disposed on one side of the axial stop member adjacent to the first face of the hub 1, and a second peripheral gearing disposed on the opposite side of the axial stop member, adjacent to the second face of the hub 1.

In the embodiment of FIGS. 1 and 2, the axial stop member is formed as a separate annular ring 18 which, as is seen most clearly in FIG. 2, has an internal circumferential surface on which there are provided indentations that extend radially outward. These indentations are preferably in the form of an internal gearing 10 which matches the external peripheral gearing 7 on the hub 1, but which has a larger internal diameter than the external peripheral gearing 7 of hub 1. This larger internal diameter of the internal gearing 10 allows the ring 18 to be matched to the external gearing 7 of the hub 1 and moved in an axial direction inward over hub 1. As is seen most clearly in FIG. 1, the external peripheral gearing 7 of the hub 1 is provided with a groove 11 that encircles the hub 1 and is cut at least part way down through the external peripheral gearing 7 thereof. During assembly, the internal gearing 10 of the ring member 18 is matched up with the external peripheral gearing 7 of the hub 1 and the ring member 18 is then moved in an axial direction toward the axial center of the hub 1. When the ring member 18 reaches a position where it is aligned with the encircling groove 11 the ring member 18 may then be rotated by some degree, preferably by about one-half tooth space. As is seen most clearly in FIG. 2, this allows the portions of the ring member 18 that extend radially inward from the inner circumference of the ring member 18 (i.e., those portions of the ring member 18 indicated by broken lines in FIG. 2) to engage the groove 11 that encircles the hub 1 and thereby lock the ring member 18 with respect to the hub 1, at least in the direction parallel to the axis of rotation 5.

The hub 1 and the ring member 18 are then rotationally interlocked to prevent any accidental relative rotational movement therebetween and thereby ensure that ring member 18 can not disengage from the hub 1. In the preferred embodiment of FIGS. 1 and 2, this rotational interlocking is accomplished through the provision of a slot 19 which extends radially inward from the tip of one of the teeth of the peripheral external gearing 7 of the hub 1. Additionally, a radially inward extending portion of the ring member 18 is provided with a preferably throughgoing hole 20, this hole 20 aligning with the slot 19 following the one-half tooth relative rotation between the ring member 18 and external peripheral gearing 7 of the hub 1. To secure the ring member 18 and the hub 1 in relative rotational disposition with respect to one another, a pin 21 may be inserted through both the slot 19 and the hole 20 and both outer ends of the pin 21 may then be deformed (e.g., bent upwards), as is seen in FIG. 1.

The construction described above results in the external peripheral gearing 7 of the hub 1 being interrupted and therefore divides the external peripheral gearing 7 into a first peripheral gearing disposed on one axial side of the ring member 18 and a second peripheral gearing disposed on the other axial side of the ring member 18. As is described in more detail below, a first clutch plate may be engaged with the first peripheral gearing, and a second clutch plate may be engaged with the second peripheral gearing, and the axial stop then ensures that the hub 1 will remain positioned between and fully engaged with both of the first and second clutch plates.

In the embodiment of the hub shown in FIG. 3, a two part hub 2 is utilized, the two part hub 2 including a hub body 4 and a separate component 16. The hub body 4 includes a first peripheral gearing 8 formed adjacent one face thereof, while the opposite face of the hub body 4 is in the form of a cylinder of reduced outer diameter $D_a$ as compared to the remainder of the hub body 4. The separate component 16 can be preferably in the form of annular member, and is provided with a second peripheral gearing 9 about its outer circumferential surface. The separate component 16 has an inner diameter $D_i$ that closely matches the reduced diameter $D_a$ of the hub body 4, thereby allowing the separate component 16 to be slid over the diameter $D_a$ of the hub body 4. Preferably, a force fit is provided to secure these two components together, however other methods of attachment may also be used. As seen most clearly in FIG. 3, the hub body 4 is provided with a knee-shaped annular shoulder (or ledge) 13 positioned between the first peripheral gearing 8 and the diameter $D_a$ which causes a peripheral groove 12 to be formed upon complete assembly of the hub body 4 and the separate component 16. Prior to such assembly, a ring 17 is placed so that it will occupy this groove 12 in the completed assembly. The ring 17 thereby forms an axial stop positioned between the first peripheral gearing 8 and the second peripheral gearing 9.

In the embodiment shown in FIGS. 4 and 5, in contrast to the embodiment of FIG. 3, the hub 3 is formed of a single piece. The hub 3 is provided with a groove 11 about its peripheral circumference which extends radially inward therefrom through the external peripheral gear teeth 7. Preferably, the groove 11 has an inner diameter d that extends radially inward beyond the root diameter (or root surface) $d_r$ of the external peripheral gearing 7. As shown most clearly in FIG. 5, the axial stop of the present invention is formed from a plurality of arcuate segments 14 which are inserted into the groove 11 and which are distributed about the periphery of the hub 3. As seen in FIG. 5, it is not necessary that the arcuate segments 14 be in contact with one another. That is, gaps can exist between adjacent arcuate segments 14. Each of the arcuate segments 14 is provided with a hole that aligns with another hole provided in the hub 3. A pin 15 passes through each of these holes in both the arcuate segments 14 and the hub 3 and thereby secures the arcuate segments 14 in position with respect to the hub 3. Preferably, these securing holes are positioned between the diameters d and $d_r$.

Figure 6:
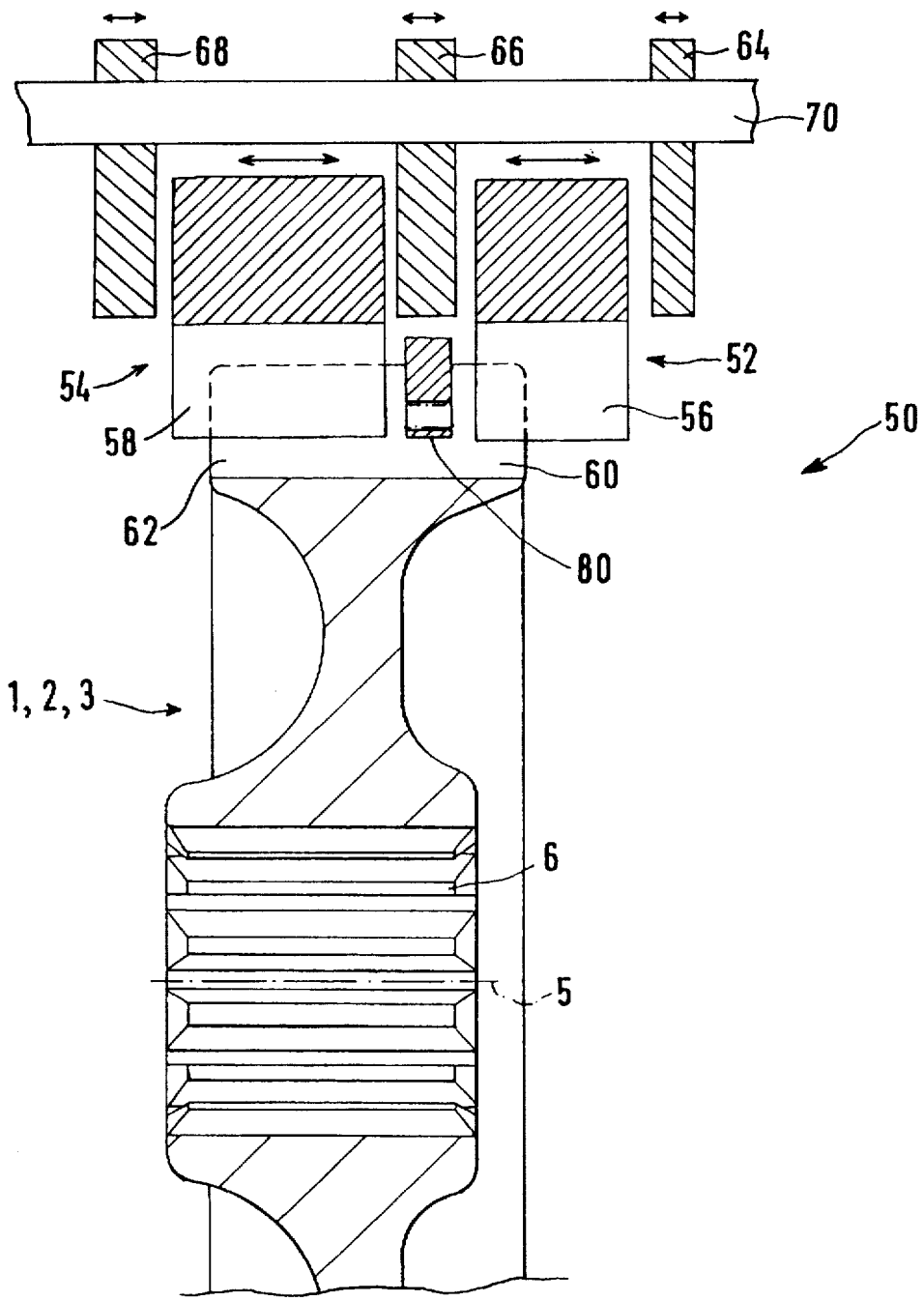
FIG. 6 is a partial sectional view of a multiple plate friction clutch according to the invention.

FIG. 6 is a partial sectional elevational view of one embodiment of a multiple plate friction clutch 50 constructed according to the present invention and utilizing a hub 1, 2 or 3 constructed as described above in connection with FIGS. 1–5. In addition to the hub 1, 2 or 3, the multiple plate friction clutch 50 additionally includes a first driven clutch plate 52 and a second driven clutch plate 54 which are positioned on opposite sides of the hub 1, 2 or 3. The first driven clutch plate 52 includes internal gear teeth 56 distributed about a radially inwardly facing surface of the first driven clutch plate 52, and the second driven clutch plate 54 includes internal gear teeth 58 distributed about a radially inward facing surface of the second driven clutch plate 54. The circumferential peripheral surface of the hub 1, 2 or 3 is provided on one side (i.e., adjacent one face thereof, the right facing face as seen in FIG. 6) with a first peripheral gearing 60 (e.g., a plurality of gear teeth projecting radially from the circumferential periphery of hub 1, 2 or 3). This first peripheral gearing 60 on the hub 1, 2 or 3 engages the internal gear teeth 56 provided on the first driven clutch plate 52. The circumferential peripheral surface of the hub 1, 2 or 3 is additionally provided on the opposite side with a second peripheral gearing 62 (again, for example, another plurality of gear teeth projecting radially from the circumferential periphery of the hub 1, 2 or 3) which engages the internal gear teeth 58 provided on the second driven clutch plate 54.

It will be appreciated that the above described arrangement provides for a rotational interlocking between the hub 1, 2 or 3 and each of the first and second driven clutch plates 52 and 54, respectively, while at the same time, permitting for a relative axial displacement (or axial float) between all of these three components namely the hub 1, 2 or 3, the first driven clutch plate 52 and the second driven clutch plate 54.

The multiple plate friction clutch 50 additionally preferably includes a plurality of driving plates, three such driving plates 64, 66 and 68 being shown in FIG. 6. The driving plates (e.g., driving plates 64, 66 and 68 in FIG. 6) are normally rotationally interlocked with, for example, the flywheel and are therefore rotationally driven thereby. However, the driving plates 64, 66 and 68 are normally additionally provided with structure permitting for the driving plates to move axially with respect to the axis of rotation 5, thereby allowing the driving plates 64, 66 and 68 to float axially, at least to some degree. In FIG. 6, directional arrows indicate the axial float of the driven plates 52 and 54 and the driving plates 64, 66 and 68.

In FIG. 6, the structure permitting axial float of the driving plates is indicated by the reference numeral 70 and is similar to the structure shown in U.S. Pat. No. 4,846,326 issued to Tilton et al. on Jul. 11, 1989 and entitled "Carbon to Carbon Friction Clutch", this U.S. patent being hereby expressly incorporated by reference herein, that is the spacer blocks 7 in U.S. Pat. No. 4,846,326 which rotationally interlock the driver plates with the flywheel but at the same time permit the driver plates to float axially to at least some degree.

The relative positioning of the driving plates 64, 66 and 68 and the driven plates 52 and 54 shown schematically in FIG. 6 corresponds to a disengagement of the clutch, wherein the driving plates 64, 66 and 68 and driven plates 52 and 54 have separated in the axial direction due to the provided axial float. Upon engagement of the clutch 50, the driving plates 64, 66 and 68 and the driven plates 52 and 54 are forced together in the axial direction by means well known in the art, for example as described in the above-incorporated U.S. Pat. No. 4,846,326 to Tilton et al., i.e., through the action of a throw out bearing, a diaphragm spring and a pressure plate, and the driver plates 64, 66 and 68 and the driven plates 52 and 54 are rotationally interlocked, with torque being transmitted to the hub 1, 2 or 3 through the engagement of gearings 56, 60 and 58, 62.

The axial stop of the present invention is illustrated schematically in FIG. 6 by reference numeral 70. As described above, the driven plates 52 and 54 are normally limited in their degree of axial float by the conventional components of the clutch. That is, for example, the distance between the flywheel and the pressure plate in the disengaged configuration normally determines the total amount of axial float of all of the driving and driven plates. The inventive axial stop 80 of the present invention serves to determine the axial positioning of the hub 1, 2 or 3 with respect to the driven plates 52 and 54. Since the axial stop 80 projects radially at least partially into the first peripheral gearing 60 and the second peripheral gearing 62, the hub 1, 2 or 3 is prevented from axial movement in either direction beyond an amount determined by the axial position at which the axial stop 80 is mounted on the hub 1, 2 or 3 and the thickness of the axial stop 80 measured along the axis of rotation B. Accordingly, the present inventive axial stop 80 prevents excessive axial float of the hub 1, 2 or 3 and ensures that the hub 1, 2 or 3 will remain fully engaged with the driven plates 52 and 54 when the clutch 50 is disengaged.

Since the axial positioning and thickness of the axial stop 70 can be easily controlled in any of the embodiments of the hub 1, 2 or 3 described above, the present invention provides an easy and efficient manner of controlling the axial positioning of the hub 1, 2 or 3 with respect to the driven plates 52 and 54.

One feature of the invention resides broadly in the multiple-plate friction clutch, in particular in the drive train of a motor vehicle friction clutch, comprising a hub which has internal gearing so that it can be non-rotationally fastened on a transmission shaft which defines an axis of rotation, which transmission shaft has external gearing for the installation of at least two clutch plates which have corresponding internal gearing by means of which they are fastened non-rotationally but so that they can move axially, whereby between the one clutch plate and the nearest other clutch plate on the hub there is an axial stop for the axial guidance of the hub with respect to the clutch plates, characterized by the fact that the hub 2, in the vicinity of its external gearing 8, 9, viewed in the axial direction, is divided in two, in that the hub body 4 is provided with a first axial partial gearing 8, and a gear-wheel-like component 16 is connected by means of a second axial partial gearing 9 with the hub body 4 such that between them there is a groove 12 in which the axial stop 17 is located.

Another feature of the invention resides broadly in the multiple-plate friction clutch characterized by the fact that the gear-wheel-like component 16 is placed by means of its inside diameter $D_i$ on an outside diameter $D_a$ of the hub body 4, and in the hub body 4 on the side facing the component 16 there is a shoulder 13 on which the axial stop in the form of a concentric ring 17 is placed.

Yet another feature of the invention resides broadly in the multiple-plate friction clutch characterized by the fact that the component 16 is preferably pressed (or shrunk) onto the hub body 4.

Some examples of components employed in multiple plate friction clutches which may be utilized in conjunction with the present invention are to be found in U.S. Pat. No. 4,846,326, issued to Tilton et al. on Jul. 11, 1989, and entitled "Carbon to Carbon Friction Clutch"; U.S. Pat. No. 5,305,943, issued to Walker on Apr. 26, 1994, and entitled "Splined Assembly"; German Patent No. 26 04 528, issued to Müller on Aug. 11, 1977; German Patent No. 39 36 871, issued to Watschon on May 23, 1990; German Patent No. 33 21 659, issued to Fujioka on Dec. 29, 1983; and German Patent No. 1 152 895, issued to Schröder on Aug. 14, 1963; each of the above patents and publications being expressly incorporated by reference herein.

Types of transmissions in which the present invention may be incorporated may be disclosed in the following U.S. patents: U.S. Pat. No. 5,199,316 to Hoffman on Apr. 6, 1993, entitled "Fully-synchronized Multiple Speed Manual Transmission for Motor Vehicles"; U.S. Pat. No. 4,458,551 to Winter on Jul. 10, 1984, entitled "Manual Transmission"; and U.S. Pat. No. 3,858,460 to Porter et al. on Jan. 1, 1975, entitled "Four Speed Manual Transmission and Control".

Types of clutch assemblies with which the present invention may be utilized may be disclosed in the following U.S. patents: U.S. Pat. No. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 49 337.0, filed on Jan. 31, 1996, and 195 18 679.6, filed on May 22, 1995, having inventors Klaus Hofmann, Klaus Betten, Jürgen Loibersbeck, Thomas Schubert, Peter Wiggen, and DE-OS 195 49 337.0 and 195 18 679.6 and DE-PS 195 49 337.0 and 195 18 679.6, incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch, said friction clutch comprising:

a hub body having an axis of rotation;

said hub body being configured to be rotationally coupled to a shaft member for the transmission of rotation about said axis of rotation from said hub body to a shaft member;

said hub body comprising a first face facing in a first direction along said axis of rotation, said hub body also comprising a second face facing in a second direction along said axis of rotation opposite to said first direction;

said hub body additionally comprising a peripheral surface extending circumferentially about said hub body, said peripheral surface having a width extending parallel to said axis of rotation between said first face of said hub body and said second face of said hub body;

at least a first clutch plate;

said first clutch plate being disposed adjacent said first face of said hub body;

said hub body comprising a first peripheral gearing, said first peripheral gearing being disposed on said peripheral surface of said hub body and extending from said first face of said hub body toward said second face of said hub body;

said first clutch plate comprising a first clutch plate gearing arrangement to engage said first peripheral gearing of said hub body;

said first clutch plate being axially translatable along said axis of rotation while maintaining engagement between said first clutch plate gearing arrangement and said first peripheral gearing of said hub body;

an axial limitation arrangement for limiting the extent of axial translation between said hub body and said first clutch plate;

at least a second clutch plate;

said second clutch plate being disposed adjacent said second face of said hub body;

said hub body additionally comprising a second peripheral gearing, said second peripheral gearing being disposed on said peripheral surface of said hub body and extending from said second face of said hub body toward said first face of said hub body;

said second clutch plate comprising a second clutch plate gearing arrangement to engage said second peripheral gearing of said hub body;

said second clutch plate being axially translatable along said axis of rotation while maintaining engagement between said second clutch plate gearing arrangement and said second peripheral gearing of said hub body;

said axial limitation arrangement being disposed between said first peripheral gearing on said hub body and said second peripheral gearing on said hub body;

said first peripheral gearing comprising a first plurality of gear teeth, said first plurality of gear teeth extending radially outward from a first root diameter along which the roots of said first plurality of gear teeth are disposed to a first outside diameter along which the radially outward tips of said first plurality of gear teeth are disposed;

said second peripheral gearing comprising a second plurality of gear teeth, said second plurality of gear teeth extending radially outward from a second root diameter along which the roots of said second plurality of gear teeth are disposed to a second outside diameter along which the radially outward tips of said second plurality of gear teeth are disposed;

said axial limitation arrangement comprising at least one arcuate member disposed about at least a portion of said peripheral surface of said hub body;

said at least one arcuate member extending radially outward beyond at least one of said first and second root diameters;

said hub body and said at least one arcuate member comprising separate and nonintegral structural components;

said hub body additionally comprising a peripheral groove extending at least partially about said peripheral surface, said peripheral groove being disposed between said first peripheral gearing and said second peripheral gearing of said hub body, said peripheral groove extending radially inward from said peripheral surface toward said axis of rotation, and said at least one arcuate member being disposed within said peripheral groove;

said at least one arcuate member comprising an annular member;

said hub body comprising a first hub member and a second hub member;

said first hub member comprising said first plurality of gear teeth and said second hub member comprising said second plurality of gear teeth;

said first hub member additionally comprising:
 a first cylindrical portion of a first diameter extending along said axis of rotation;
 a second cylindrical portion of a second diameter extending along said axis of rotation, said second diameter being substantially greater than said first diameter; and
 a third cylindrical portion of a third diameter extending along said axis of rotation, said third diameter being substantially greater than said second diameter;

said second hub member comprising an annular surface encircling said first cylindrical portion of said first hub member; and said annular member being disposed about said second cylindrical portion of said first hub member and between said first cylindrical portion of said first hub member and said third cylindrical portion of said first hub member.

2. A friction clutch according to claim 1, wherein said annular surface of said second hub member at least frictionally engages said first cylindrical portion of said first hub member.

3. A friction clutch according to claim 2, wherein said first plurality of gear teeth have a substantially identical tooth shape and tooth spacing as said second plurality of gear teeth.

4. A hub body for a friction clutch having an axis of rotation, the friction clutch including at least a first clutch plate and a second clutch plate, the first clutch plate including first clutch plate gearing for engaging with said hub body and the second clutch plate including second clutch plate gearing for engaging with said hub body, said hub body comprising:

a rotational interlocking arrangement to rotationally interlock said hub body to a rotatable shaft member;

a first face facing in a first direction along the axis of rotation;

a second face facing in a second direction along the axis of rotation opposite to said first direction;

a peripheral surface extending circumferentially about said hub body, said peripheral surface having a width extending parallel to said axis of rotation between said first face of said hub body and said second face of said hub body;

first peripheral gearing being disposed on said peripheral surface of said hub body adjacent said first face of said hub body;

said first peripheral gearing on said hub body for being engaged by the first clutch plate gearing of the first clutch plate;

second peripheral gearing being disposed on said peripheral surface of said hub body adjacent said second face of said hub body;

said second peripheral gearing on said hub body for being engaged by the second clutch plate gearing of the second clutch plate;

an axial limitation arrangement to limit the extent of axial translation between said hub body and at least one of the first and second clutch plates;

a peripheral groove extending at least partially about said peripheral surface of said hub body, said peripheral groove extending radially inward from said peripheral surface of said hub body toward the axis of rotation;

said peripheral groove being disposed axially between said first and second peripheral gearings;

said axial limitation arrangement comprising at least one arcuate member disposed within said peripheral groove;

a first hub member and a second hub member;

said first hub member comprising said first peripheral gearing and said second hub member comprising said second peripheral gearing;

said first hub member additionally comprising:
 a first cylindrical portion of a first diameter extending along the axis of rotation;
 a second cylindrical portion of a second diameter extending along the axis of rotation, said second diameter being substantially greater than said first diameter; and
 a third cylindrical portion of a third diameter extending along the axis of rotation, said third diameter being substantially greater than said second diameter;

said second hub member comprising an annular surface encircling said first cylindrical portion of said first hub member; and said at least one arcuate member being disposed about said second cylindrical portion of said first hub member and between said first cylindrical portion of said first hub member and said third cylindrical portion of said first hub member.

5. A friction clutch for a motor vehicle, said friction clutch comprising:

a hub body having an axis of rotation;

said hub body being configured to be non-rotationally coupled to a transmission shaft member to transmit torque from said hub body to a transmission shaft member;

said hub body comprising a first face facing in a first direction along said axis of rotation;

said hub body also comprising a second face facing in a second direction along said axis of rotation opposite to said first direction;

said hub body additionally comprising a peripheral surface extending circumferentially about said hub body;

said peripheral surface of said hub body having a width extending parallel to said axis of rotation between said first face of said hub body and said second face of said hub body;

said hub body comprising a first hub member and a second hub member;

said first hub member comprising a first plurality of gear teeth and said second hub member comprising a second plurality of gear teeth;

said first plurality of gear teeth being disposed on said peripheral surface of said hub body and extending from said first face of said hub body toward said second face of said hub body;

said first plurality of gear teeth extending radially outward from a first root diameter along which the roots of said first plurality of gear teeth are disposed to a first outside diameter along which the radially outward tips of said first plurality of gear teeth are disposed;

said second plurality of gear teeth being disposed on said peripheral surface of said hub body and extending from said second face of said hub body toward said first face of said hub body;

said second plurality of gear teeth extending radially outward from a second root diameter along which the roots of said second plurality of gear teeth are disposed to a second outside diameter along which the radially outward tips of said second plurality of gear teeth are disposed;

a first clutch plate;

said first clutch plate being disposed adjacent to said first face of said hub body;

said first clutch plate comprising a first gearing arrangement to engage with said first plurality of gear teeth;

said first clutch plate being axially translatable along said axis of rotation while maintaining engagement between said first gearing arrangement and said first plurality of gear teeth;

a second clutch plate;

said second clutch plate being disposed adjacent to said second face of said hub body;

said second clutch plate comprising a second gearing arrangement to engage with said second plurality of gear teeth;

said second clutch plate being axially translatable along said axis of rotation while maintaining engagement between said second gearing arrangement and said second plurality of gear teeth;

an axial limitation arrangement to limit the extent of axial translation between said hub body and said first clutch plate;

said axial limitation arrangement comprising an annular member disposed about said peripheral surface of said hub body;

said annular member extending radially outward beyond at least one of said first and second root diameters;

said hub body additionally comprising a peripheral groove extending about said peripheral surface;

said peripheral groove being disposed between said first plurality of gear teeth and said second plurality of gear teeth;

said peripheral groove extending radially inward from said peripheral surface toward said axis of rotation;

said annular member being disposed within said peripheral groove;

said first hub member additionally comprising:
   a first cylindrical portion having a first diameter extending along said axis of rotation;
   a second cylindrical portion having a second diameter extending along said axis of rotation, said second diameter being substantially greater than said first diameter; and
   a third cylindrical portion having a third diameter extending along said axis of rotation, said third diameter being substantially greater than said second diameter;

said second hub member comprising an annular surface encircling said first cylindrical portion of said first hub member; and said annular member being disposed about said second cylindrical portion of said first hub member and between said first cylindrical portion of said first hub member and said third cylindrical portion of said first hub member.

6. The friction clutch according to claim 5, wherein said hub body and said annular member comprise separate and non-integral structural components.

7. The friction clutch according to claim 6, wherein said annular surface of said second hub member at least frictionally engages said first cylindrical portion of said first hub member.

8. The friction clutch according to claim 7, wherein said first plurality of gear teeth have a substantially identical tooth shape and tooth spacing as said second plurality of gear teeth.

* * * * *

UNITED STATES PATENT AND TRADEMARK OFFICE
CERTIFICATE OF CORRECTION

PATENT NO. : 5,743,367
DATED : April 28, 1998
INVENTOR(S) : Klaus HOFMANN, Klaus BETTEN, Jürgen LOIBERSBECK, Thomas SCHUBERT, and Peter WIGGEN It is certified that error appears in the above-identified patent and that said Letters Patent is hereby corrected as shown below:

On the Title Page, Item [56], after the '2256240' reference under the FOREIGN PATENTS DOCUMENTS section, insert the following references:

```
-- 60 192 123    9/1985    Japan
   26 91 223    11/1993    France --.
```

Signed and Sealed this

Eighth Day of June, 1999

Attest:

Q. TODD DICKINSON

Attesting Officer

Acting Commissioner of Patents and Trademarks